Jan. 1, 1963    J. H. NEELY ETAL    3,071,678
ARC WELDING PROCESS AND APPARATUS
Filed Nov. 15, 1960    2 Sheets-Sheet 2
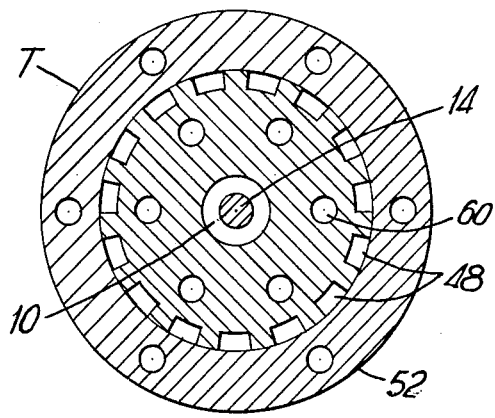
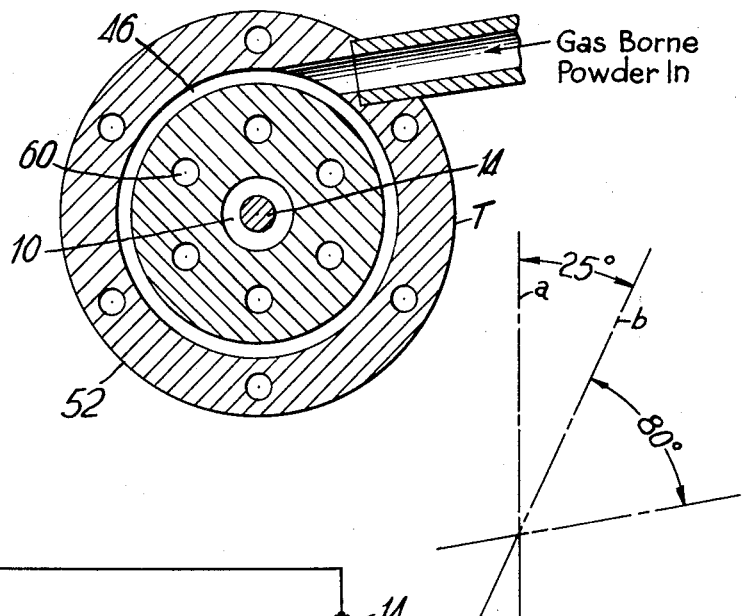
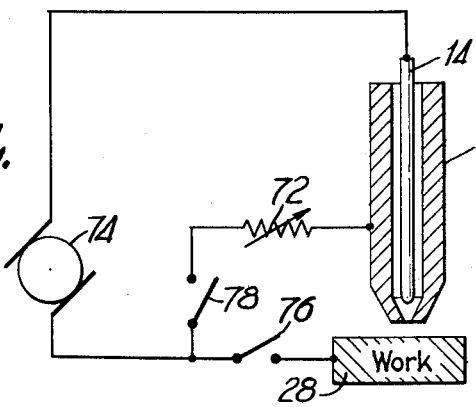
INVENTORS
JOHN H. NEELY
ROBERT S. ZUCHOWSKI
WILLIAM B. SHARAV
FREDERICK H. SASSE
BY Barnwell P. King
ATTORNEY United States Patent Office 3,071,678
Patented Jan. 1, 1963

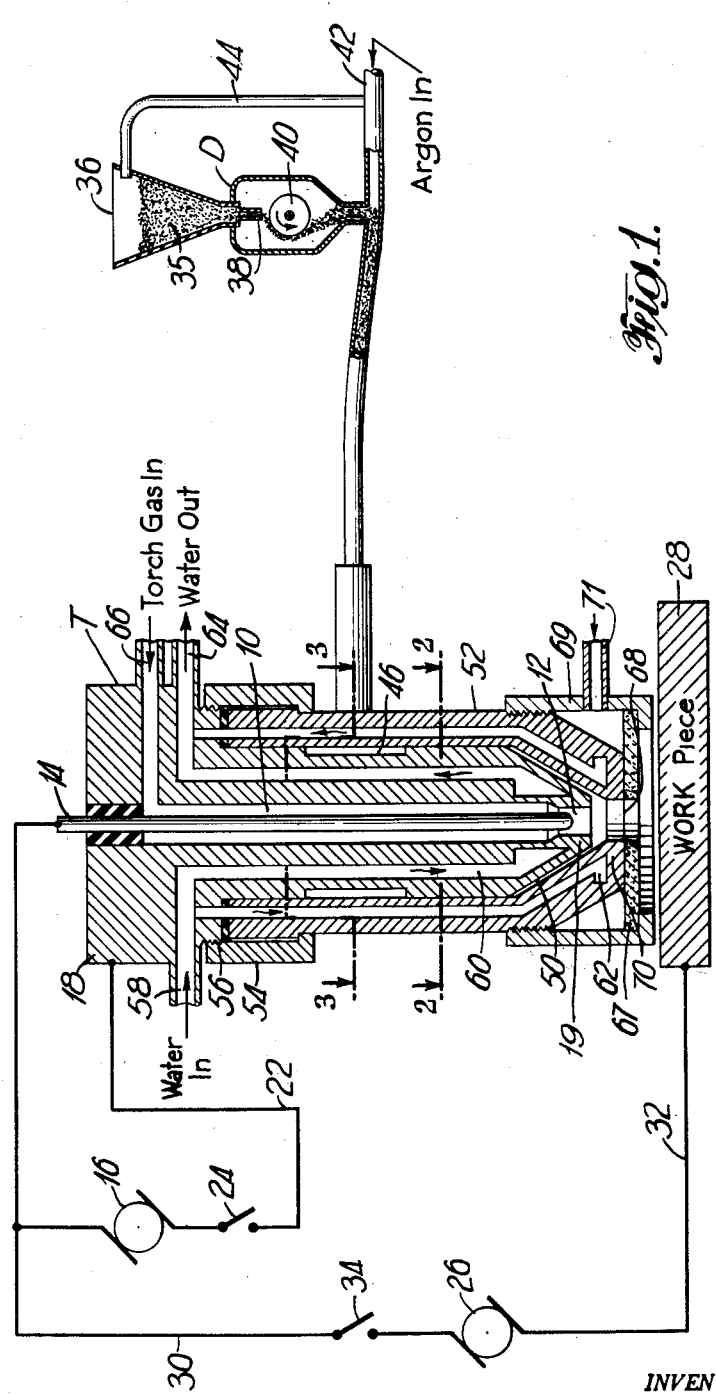

3,071,678
ARC WELDING PROCESS AND APPARATUS
John H. Neely, Watertown, Mass., and Robert S. Zuchow-
ski, Union, William B. Sharav, Short Hills, and Fred-
erick H. Sasse, Maplewood, N.J., assignors to Union
Carbide Corporation, a corporation of New York
Filed Nov. 15, 1960, Ser. No. 69,325
10 Claims. (Cl. 219—76)

This invention relates to arc welding and more particularly to weld-surfacing a metal body with metal.

The invention provides a novel process of electric arc welding with gas-borne powdered filler metal, which comprises discharging the plasma of a wall-stabilized arc toward the work through the axial center of a conical stream of gas-borne powder in which the metal powder is uniformly distributed around such plasma as it merges therewith and applying the resultant plasma-borne powder to the surface of such work.

Surfacing involves depositing a layer of metal of one composition onto the surface of a base metal of the same or another composition. The resulting metal overlay may be used to protect the base metal from wear, corrosion, erosion, abrasion, impact, etc. Industry has long needed an electric arc process capable of producing welded metal overlays ranging in thickness from 0.010 inch to ⅛ inch and having less than 20 percent weld dilution. Overlays less than about 5/32 inch thick prepared with the consumable wire inert-gas or submerged-arc processes usually have dilutions much greater than 20 percent. However, deposits with less than 20 percent dilution can in some cases be prepared using the non-consumable tungsten electrode inert-gas arc welding process. Such process imposes a severe restriction in that the surfacing rate must be reduced below an economically practical value, or the deposit thickness must be increased to above 3/32 inch which may be greater than that desired. Furthermore, such known processes require that the surfacing material be available in either wire or rod form. Some hard-facing metal such as Haynes Stellite No. 1, No. 6 and No. 12 alloys, because of their physical properties, cannot be drawn into wire, but must be cast into short lengths of rod. Mechanization of the tungsten inert-gas process becomes very difficult when cast rods are used as the filler metal.

With our novel process, as described hereinafter, weld overlays 0.010 inch thick and greater, having much less than 20 percent dilution, can be produced. Since this process uses surfacing metal in powder form, almost or practically any preselected composition of metal may be employed. The present process also is more amenable to mechanization as compared with the prior tungsten inert-gas process using hard-facing alloys which cannot be drawn into wire. By "tailoring" the powder formulation, any alloy desired can be made. Also, readily available and inexpensive alloy-rich powders can be deposited with relatively high dilution, thus producing metal overlays of lower alloy content having desirable properties. For example, 50 percent diluted deposits made with high-carbon ferrochrome powder of 66 percent Cu 5 percent C composition will contain approximately 33 percent chromium and 2.5 percent carbon, a common alloy for hard-facing alloy.

Prior metal spraying processes employing either the electric arc or combustible gas were capable of producing coatings ranging from 0.001 to ⅟₁₆ inch in thickness with practically no dilution. However, compared with our novel process, such processes have a number of serious disadvantages including:

(1) The as-deposited metal spray coating was principally mechanically bonded to the workpiece, and the bonding properties exhibited were relatively weak. Our deposits, on the other hand, are fully fusion bonded to the workpiece, thus producing a strong weld-bond. This physical characteristic is especially important where impact and high stress conditions are encountered. As a means toward improving the bond strength of prior metal spray coatings, the workpiece was often prepared by etching, rough machining, or applying a molybdenum first layer prior to the coating step. However, such methods were both laborious and time consuming.

(2) On flat member, metal spray coatings were generally limited to less than ⅟₁₆ inch in thickness; and too heavy a deposit often resulted in complete separation of the coating from the workpiece during the coating operation. Our deposits, which are weld-bonded to the workpiece, need not be so limited in thickness, and deposits as thick as 0.190 inch can be made by our process in one pass. Furthermore, multi-layers do not result in peeling.

(3) The microstructure of prior as-deposited metal spray coatings consisted of inter-linked metallic platelets partially fused and partially mechanically bonded to each other. The coating often contained metal oxides and was usually less than 90 percent of theoretical density. In corrosive applications, such deficiency generally limited the coating material to those which were anodic to the base metal. Hence, in order to produce a fused coating, reheating of the coating was necessary. Such operation, too, was costly and time consuming. In contrast, our deposits form a completely fused-continuous cast structure, attaining 100 per cent theoretical density as-deposited; and a uniform non-porous surface which completely protects the base metal.

Therefore, the prime object of this invention to provide a novel method of and means for weld-surfacing a metal workpiece with metal; novel means capable of producing electric arc effluents which permit the transfer of heat to the metallic additive and workpiece, producing fusion of the metallic additive and a weld-bond between the additive and the workpiece. Also, improved means for utilizing a metallic additive in powder form at high efficiency. Another object is to provide a method of and control means for depositing metal in a manner to insure a welded deposit of preselected relative dilution.

According to the present invention, weld-surfacing is accomplished by energizing a high pressure power arc between a non-consumable electrode and the workpiece. Such arc is constricted to collimate its energy, thus yielding a high thermal effluent. Gas borne metallic powder is funnelled into the arc effluent. Such powder is thereby heated and subsequently applied and weld-bonded to the workpiece.

To insure high efficiency and a uniform distribution of the powder in the arc effluent, the gas-conveyed powder is first introduced tangentially into an annular powder chamber in the torch. Such chamber is of limited area and size so as to impart a high velocity swirling action to the powder and thereby uniformly distribute the powder about the periphery of the chamber. The gas powder stream is thereafter straightened by passage through a series of straight flutes which are parallel to the longitudinal axis of the torch and feed the gas-borne powder to a funnel concentric with such axis.

The flutes may also be of a zigzag design (alternately sloping positively and negatively) so as to reduce the exit velocity of the powder and thereby improve powder efficiency. Upon leaving the flutes, the gas borne powder is further guided by such funnel into the arc effluent immediately beneath the arc stabilizing orifice.

The angle between the direction of powder entry with the effluent and the axis of such effluent is critical. With too large an angle the powder-gas stream becomes turbulent at its point of entry into the arc effluent, resulting in low powder efficiency and, in some cases, powder plugging in the powder opening. On the other hand, if the angle of entry is too small, the powder is insufficiently heated resulting in metal deposits on the work that are not completely fused. A powder entrance angle of approximately 30 degrees (with the longitudinal axis of the torch) has been found to be ideal, although such angle may range between 25° and 80°. In the case of 30°, the powder theoretically intersects the central axis of the collimated arc about $5/16$ inch below the arc constricting orifice.

An outer sleeve of the torch is adjustable so that the width of the funnel can be ideally set. The ideal funnel width is a function of the powder sizing, gas powder velocity and surfacing material. The size of the funnel affects the powder exit velocity and the focal point of the powder below the orifice. Experiments have indicated that the powder chambers in the torch satisfactorily perform their functions when using powder as large as Tyler 20 x 30 mesh size. It is to be noted that without the flutes, the powder exiting from the lower annular channel will vortex with little or no powder entering the collimated arc. Further, if the powder is introduced into the electrode bore and made to pass through the arc constricting orifice, the process is rendered more difficult to control. This is so, because with relatively low central gas velocities, the metallic powders tend to fuse to the orifice wall as well as to each other. After a short time, they rapidly build-up, changing the orifice diameter and shape, and eventually render the apparatus inoperative.

This invention preferably though not necessarily employs transferred and non-transferred arcs which are independent of each other and are adjustable to meet particular operating conditions. Specifically, a non-transferred arc is used to control the heat to the effluent and metallic powder. Whereas, the transferred arc supplements the heat to the powder and controls the heat to the workpiece, thereby controlling weld dilution. The powder of the non-transferred arc will also affect weld dilution to a limited degree. Two independently controlled power sources provide suitable means for selecting a wide range for the most desirable operating conditions. For example, with high melting point materials such as tungsten, it is preferred to use a high non-transferred arc current to facilitate melting of the metal powder. On the other hand, when depositing materials such as stainless steel, or copper, lower non-transferred arc energy can be used. Although electrically less efficient, a variable resistor in the circuit arrangement may be used to replace the non-transferred arc power supply. With such an arrangement, however, some independence of control over the transferred and non-transferred arcs is lost.

In the present invention, the metallic particles issuing from the torch may be only partially molten. Such particles, however, undergo complete melting upon contacting the molten puddle on the workpiece. Such puddle provides the heating medium by which all of the metallic particles become molten upon contact, thus forming a homogeneous weld deposit. The present invention also develops void-free deposits of 100 percent theoretical density.

The success of this invention depends on a "soft" or relatively low velocity effluent. High gas flows through the torch result in violent puddle disturbances producing unsatisfactory deposits. Consequently, this invention can be practiced using gas flows through the central bore of the torch of order of about 5 c.f.h., although the invention is not restricted thereto. The flow rate of the gas which conveys the powder is of secondary importance and is adjusted for the minimum at which it will adequately perform its functions. The exact value depends on the type and sizing of the metallic powder and the relative location of the various equipment components. As described by the examples herein, such gas flow rate ranges from 7 to 15 c.f.h.

Various gases can be used with this process, such as argon, helium, hydrogen, nitrogen, or carbon monoxide, depending on whether an inert, reducing, or very high temperature effluent is required. Similarly, gas mixtures can be used. Also, the central arc-effluent gas can be different from the powder-conveying gas. When surfacing with certain materials, and depending on the particular process conditions, it may be desirable to employ auxiliary gas shielding circumferentially around the arc zone to prevent atmospheric contamination of the molten deposit. This is accomplished by a porous disk (gas lens) which is supported by a cylindrical wall secured to the torch. Gas is supplied to the chamber by an inlet pipe.

It has been found that a D.C. power source using straight or reverse polarity, or an A.C. power source may be employed for the transferred and non-transferred arcs. However, direct current-straight polarity power is preferred.

Arc constricting orifices ranging in diameter from $1/8$ inch to $5/16$ inch have been tried by us, although $5/32$ inch and $3/16$ inch diameter orifices are most suitable for weld-surfacing. A $5/32$ inch diameter orifice is used when surfacing small areas where a "stiff" arc is desired to prevent "arc-wander." As a case in point, the invention was used in the surfacing of truck and automotive valve faces. A $3/16$ inch diameter orifice is preferred when a "soft" arc is desired. The larger the orifice diameter, the greater is the tendency for arc to wander while the smaller the orifice diameter, the "stiffer" the arc and the greater the weld penetration. The electrode setback, i.e. the distance between the electrode tip and the lower end of the orifice, is ideally equal to the orifice diameter. Too great a set-back reduces the heat in the effluent and may cause the non-transferred arc to arc-over inside the electrode bore, resulting in difficult transferred arc starting, as well as deterioration of the inside of the torch. Too small a set-back results in a non-collimated arc which is unsuitable. Larger orifices than those specified above, however, are contemplated with higher arc current values, without departing from the invention.

Metallic powder sizes ranging from Tyler 150 x D up to 20 x 30 mesh are satisfactory. The finer sizes are more easily melted in the arc and are used when a homogeneous deposit is desired. The larger sizes are used in special cases when it is desired to produce a heterogeneous deposit with little melting of the powder additive. An example of the latter case is evident when a deposit containing tungsten carbide particles in a matrix of base metal is desired.

In addition to surfacing operations, metallic powders with or without deoxidizing powders may be used according to the invention to effect fusion between two base plates as in a welding operation.

The table lists typical operating conditions found suitable for weld-surfacing with iron, nickel, copper, tungsten and cobalt base materials according to the invention. These deposits are weld bonded to the workpiece and have 100 percent theoretical density. By controlling process variables such as thermal energy transfer, orifice size, shielding gas, and powder sizing, a wide variety of materials may be weld deposited, thus imparting a high degree of flexibility to the process of the invention described herein.

In the drawings:

FIG. 1 is a diagrammatic view, partly in cross-section, of surfacing apparatus illustrating the invention;

FIGS. 2 and 3 are cross-sectional views taken on lines 2—2 and 3—3 of the torch shown in FIG. 1;

FIG. 4 is a view similar to FIG. 1 of a modification; and

FIG. 5 is a diagram of the angular range of the funnel passage with the axis of the torch.

As shown in FIG. 1, torch T has an internal cylindrical bore 10 which terminates at its lower end in an arc stabilizing orifice 12 having a cylindrical inner wall. Centered axially in this bore and electrically insulated from the torch body is a non-consumable stick electrode 14 of suitable material such as tungsten, water-cooled copper or tungsten tipped copper. An adjustable welding power source 16 is connected between the electrode 14 and body 18 through a non-transferred switch 24. Power source 16 controls the operating characteristics of the non-transferred arc between electrode 14 and orifice 12 of nozzle 19 of the body 18.

Another adjustable welding power source 26 is connected between the electrode 14 and workpiece 28 through a transferred arc circuit including conductors 30 and 32, the former containing a switch 34. The purpose of power source 26 is to control the transferred arc power between electrode 14 and workpiece 28, thereby controlling the degree of heating of the workpiece and relative weld dilution. The two power sources 16 and 26 preferably are connected, in the case of D.C., so that electrode 14 is negative (straight polarity). A suitable shielding gas such as argon is introduced into the bore 10 to shield the electrode and support the non-transferred arc as well as the transferred arcs.

The metallic powder 35 is stored in an air-tight powder hopper 36. From the hopper, the powder passes through an adjustable spout 38 onto the surface of an adjustable speed wheel 40. The powder falls from the rotating wheel 40 and is conveyed to the torch T by a suitable carrier gas such as argon supplied through conduit 42. Gas is also introduced into the top of the hopper through a branch 44 to maintain a constant pressure on the top of powder 35 and to insure uniform metering through the spout 38. Powder flow rates are varied by changing the hopper spout-to-wheel distance and/or wheel speed.

Gas-borne powder from dispenser D is introduced tangentially into an annular powder chamber 46, FIG. 3, in the torch T. This chamber 46 is of such area and size as to impart a high velocity swirling action to the powder and thereby uniformly distribute the powder around the periphery of the chamber. Such gas-borne powder stream thereupon is straightened by passage through an array of parallel flutes 48, which are spaced about the periphery of the nozzle and are parallel to the longitudinal axis of the torch. After leaving the flutes 48, the gas-borne powder is further guided by a conical funnel 50 so that it enters the arc effluent immediately beneath, but as close as practical, to the orifice 12. Funnel 50 is concentric with the longitudinal axis $a$, FIG. 5, of the torch T, and the inclined axis $b$ of such funnel is between 25° and 80° with respect to axis $a$. This powder distributing system provides uniform powder distribution into the collimated arc and high powder heating efficiency. A sleeve 52 which encloses the powder chamber and passages and helps guide the powder to the arc effluent, is axially adjustable by means of a nut 54 threaded to the torch body at 56. This allows adjustment the width of the conical funnel 50 for optimum powder heating efficiency. Provision is made for water cooling the torch body 18 and the sleeve 52, including a water inlet 58, passage 60 in body 18, passage 62 in sleeve 52, and water outlet 64. Gas enters the torch body via inlet 66.

As shown in FIG. 1, the torch may be provided with auxiliary gas shielding means such as a porous gas lens 67 which is held in place by a casing 69 which is threaded to the body 18, and into which suitable shielding gas is delivered via inlet 71.

When a transferred arc is established between the end of electrode 14 and workpiece 28, the arc plasma takes the configuration of inner wall of orifice 12, producing a collimated arc that is wall-stabilized. The gas-borne powder is introduced by funnel 50 into the effluent where it is heated, accelerated through outlet 68 of nozzle 70 of sleeve 52, and deposited on the workpiece 28.

In operation the torch gas and cooling water are first turned on. The open-circuit voltage of power source 16 is impressed across the electrode 14 and torch body 18 by closing the switch 24. Thereafter, either a momentary pulse of high-frequency current impressed between the electrode 14 and nozzle 19, or by "touch" starting, a non-transferred arc is initiated. Gas-borne metallic powder issues from the powder dispenser D, passes through the torch T and subsequently unites with the high thermal effluent immediately below the orifice 12. A transferred arc between the electrode 14 and workpiece 28 is established by closing switch 34. When linear motion is imparted to the torch T with respect to the workpiece 28, a stringer-type bead is deposited. The torch T may also be oscillated transverse to its direction of travel and thus produce relatively wide deposits.

The transferred arc is extinguished by opening switch 34. The non-transferred arc thereupon serves as a pilot arc, keeping the torch in a standby condition. On occasion it may be beneficial to use only the transferred arc, for example, when relatively low melting point materials, such as copper, are deposited. Here the non-transferred arc switch 24 is opened immediately after establishing the transferred arc, and closed again immediately before extinguishing the transferred arc.

As shown in FIG. 4, the circuit arrangement includes a variable resistor 72 in circuit relation with only one power source 74 wherein control of the energy supplied to the non-transferred arc is effected through adjustment of such variable resistor 72. In this modification switches 76 and 78 are provided for switching the transferred arc and the non-transferred arc, respectively, "on" and "off."

As shown in FIG. 1, gas introduced axially into the torch T at about 5 c.f.h. increases in velocity after being simultaneously constricted and also thermally heated by energy of the non-transferred arc and/or the transferred arc thermal energy; and said gas as it issues from the torch orifice combines with the gas-borne metallic powder. The resulting effluent has a sufficiently low velocity that the weld puddle is not blown from the arc zone on the work 28.

The invention includes the following novel features:

(1) A system for the tangential introduction of metallic powder (up to Tyler 20 x 30 mesh size) into an annular distribution chamber in the torch wherein parallel flutes guide the so-distributed gas-borne powder into an adjustable funnel to further control the powder velocity and thereby the focal point of the powder particles delivered by such funnel to the arc effluent.

(2) Two power sources providing means for independently controlling the energy input to the non-transferred arc and transferred arc, respectively; wherein such means provide a degree of operator control over the relative amount of melting of the base metal and the metallic particles issuing unto said base metal.

The following table lists operating examples and results illustrative of the invention:

Plasma Arc Surfacing Deposits

Base material—mild steel; electrode material—2% thoriated tungsten; orifice diameter, Inches—3/16; orifice length, inches—1/4; torch, powder, shielding gas—argon; 30° powder entrance angle

| Weld No. | Transferred arc | | Non-Transferred Arc | | Torch gas flow (c.f.h.) | Powder gas flow (c.f.h.) | Shielding gas flow (c.f.h.) | Metal powder | | |
|---|---|---|---|---|---|---|---|---|---|---|
| | Current (amp.-DCSP) | Voltage (volts) | Current (amp.-DCSP) | Voltage (volts) | | | | Material | Tyler size | Feed (gm./min.) |
| 651-24-9 | 130 | 27 | 150 | 14 | 9 | 15 | None | Haynes stellite #157 M alloy | 150 x 250 | 15 |
| 651-24-1 | 150 | 30 | 80 | 14 | 6 | 7 | None | Hi-carbon ferrochromium | 100 x D | 11 |
| 651-24-2 | 150 | 30 | None | None | 6 | 7 | None | ----do---- | 100 x D | 11 |
| 651-40-2 | 110 | 29 | 55 | 13 | 5 | 13 | 60 | Copper | 150 x D | 24 |
| 651-40-4 | 120 | 33 | 55 | 15 | 5 | 13 | 60 | Metco #41C 18/8 stainless steel | 150 x D | 26 |
| 651-40-6 | 130 | 27 | 55 | 13 | 5 | 13 | 60 | Haynes stellite #43 M alloy | 150 x 250 | 25 |
| 651-40-11 | 215 | 36 | 55 | 14 | 5 | 13 | 60 | Tungsten carbide (Haystelite WC) | 20 x 30 | 43 |
| 651-40-12 | 70 | 33 | 130 | 15 | 5 | 13 | None | Haynes stellite tungsten | 200 x D | 15 |
| 651-40-13 | 135 | 33 | 55 | 13 | 5 | 13 | 60 | Haynes stellite #6 alloy | 150 x D | 15 |
| 651-40-14 | 110 | 38 | 55 | 13 | 5 | 13 | 60 | Aluminum | 100 x D | 10 |
| 651-40-15 | 130 | 35 | 55 | 13 | 5 | 13 | 60 | Mechanical mixture: Copper 90%, aluminum 10%. | 100 x D | 25 |

| Weld No. | Electrode | | Travel speed (i.p.m.) | Oscillation frequency (c.p.m.) | Powder sleeve to-work distance (in.) | Nozzle to-work distance (in.) | Weld width (in.) | Weld thickness (in.) | Approximate weld dilution (percent) |
|---|---|---|---|---|---|---|---|---|---|
| | Setback (in.) | Diameter (in.) | | | | | | | |
| 651-24-9 | 5/32 | 1/8 | 5 | 100 | 1/4 | 3/8 | 5/8 | 1/64 | 3 |
| 651-24-1 | 5/32 | 1/8 | 52 | None | 5/8 | 3/4 | 3/4 | 1/64 | 50 |
| 651-24-2 | 5/32 | 1/8 | 52 | None | 5/8 | 3/4 | 7/64 | 1/64 | 40 |
| 651-40-2 | 5/32 | 5/32 | 5 | 150 | 5/16 | 9/16 | 5/8 | 9/64 | 1 |
| 651-40-4 | 1/4 | 5/32 | 6 | 150 | 3/8 | 5/8 | 5/8 | 9/64 | 5 |
| 651-40-6 | 1/8 | 5/32 | 10 | 150 | 1/4 | 1/2 | 5/8 | 3/64 | 3 |
| 651-40-11 | 7/32 | 5/32 | 9 | 120 | 7/16 | 21/64 | 5/8 | 1/16 | 50 |
| 651-40-12 | 7/32 | 5/32 | 3.5 | 130 | 3/8 | 19/64 | 9/16 | 1/16 | 3 |
| 651-40-13 | 7/32 | 5/32 | 5 | 190 | 3/8 | 19/64 | 9/16 | 1/16 | 3 |
| 651-40-14 | 7/32 | 5/32 | 5 | 115 | 3/8 | 27/32 | 5/8 | 1/16 | 1 |
| 651-40-15 | 7/32 | 5/32 | 8 | 150 | 3/8 | 25/32 | 1 1/16 | 1/16 | 2 |

What is claimed is:

1. Process of weld-surfacing which comprises discharging suitable gas through a nozzle having an inner cylindrical wall surrounding the end portion of a non-consumable stick electrode in spaced concentric relation, energizing a non-transferred high pressure arc between the end of such electrode and said nozzle to produce an effluent, feeding surfacing metal in the form of gas-borne powder through a funnel shaped passage the central axis of which is concentric with the axis of such stick electrode, in a converging conical stream into the effluent of such arc downstream with respect to such cylindrical wall, and applying such powder carrying effluent to the surface of the workpiece to melt and simultaneously fusion weld such metal surfacing powder thereon.

2. Process as defined by claim 1, in which a transferred arc is also energized between said workpiece and said stick electrode to improve the operation.

3. Process of weld-surfacing a body of base metal with surfacing metal to provide a controlled amount of dilution of the surfacing metal with the base metal, which comprises striking a non-transferred power arc between the end of a non-consumable center electrode and the inner annular wall of the orifice of a first nozzle concentric with such electrode, feeding suitable gas through orifice to discharge such an arc effluent axially therefrom, feeding powdered surfacing metal in suitable gas to suitably spaced longitudinal passages arranged in a circle concentric with the longitudinal axis of such nozzle, delivering such gas-borne powder discharged by said passages to such arc through a funnel concentrically surrounding such orifice at a powder entrance angle of between 25 degs. and 80 degs., focussing the resulting effluent through a second nozzle having an outlet the inner wall of which is concentric with said axis but larger than such orifice of said first nozzle, and applying such effluent to the surface of the body of base metal to be coated while conducting electric current through such effluent between such body and said center electrode to provide a transferred power arc therebetween, the central gas velocity and such concentration of the powder in the center of the arc effluent, cooperating with the relative ratio of current in such non-transferred arc to the current in such transferred arc thereby to control the relative dilution of the resulting coating with the adjacent metal of the body.

4. Apparatus for surfacing which comprises an arc torch including a non-consumable central electrode, an inner nozzle provided with a cylindrical inner wall that is spaced from yet concentric with the end of said electrode, means for feeding suitable arc gas only to the space between such electrode and inner wall for discharge from said inner nozzle, means for energizing a non-transferred arc between said nozzle and said electrode, said nozzle having cooling liquid passages adjacent such inner wall, means for circulating cooling liquid through such passages, means for energizing a transferred arc between the end of said electrode and a workpiece to be surfaced, and an outer nozzle mounted on said inner nozzle, said outer nozzle having an orifice somewhat larger than that of said inner nozzle, said nozzles having matching conical surfaces providing a funnel-like way for delivering a convergent stream of gas-borne powder to the transferred arc effluent immediately after such effluent is discharged by said inner nozzle, said outer nozzle having cooling liquid passages adjacent such larger orifice, and means for circulating cooling liquid therethrough.

5. Apparatus as defined by claim 4, in which each of such arcs is energized by an individual power source that is adjustable.

6. Apparatus as defined by claim 4, in which both of such arcs are energized by a common source of power through suitable circuits at least one of which is provided with an adjustable impedance for controlling the amount of power supplied to the corresponding arc.

7. Apparatus as defined by claim 4, in which means are provided for adjusting the width of such funnel-like way.

8. Apparatus as defined by claim 4, in which the angle of inclination of such funnel-like way with the longitudinal axis of the first nozzle is between 25 and 80 degrees.

9. Electric arc welding apparatus which comprises a plasma arc torch including a body having a central gas passage provided with a constricted orifice the inner wall of which is cylindrical, a central non-consumable electrode mounted on such body within such central gas passage but electrically insulated therefrom the end of said electrode being located within such orifice, means for energizing a non-transferred arc between such electrode and such orifice, said body having a conical outer surface concentric with said cylindrical inner wall, a sleeve mounted on said body having a conical inner surface spaced from such conical outer surface, forming a gas-borne powder funnel concentric with the longitudinal axis of the torch for delivering gas-borne powder to the arc effluent immediately after discharge thereof from such orifice, said sleeve having a nozzle provided with an orifice having an inner wall concentric with such axis, means for energizing a transferred arc between the end of such electrode and a workpiece, and means for selectively switching such arcs "on" and "off" as may be required to suit desired welding conditions.

10. Process of electric arc welding with gas-borne powdered filler metal, which comprises discharging the plasma of a wall-stabilized arc from a first water-cooled nozzle toward the work through the axial center of a conical stream of gas-borne powder in which the metal powder is uniformly distributed around such plasma as it merges therewith immediately after the discharge of such plasma from such nozzle, and passing the resultant plasma-borne powder through a second water-cooled nozzle as it flows axially therethrough toward such work.

References Cited in the file of this patent

UNITED STATES PATENTS

| | | |
|---|---|---|
| 2,768,279 | Rava | Oct. 23, 1956 |
| 2,806,124 | Gage | Sept. 10, 1957 |
| 2,858,411 | Gage | Oct. 28, 1958 |
| 3,016,447 | Gage et al. | Jan. 9, 1962 |